United States Patent [19]

Demke et al.

[11] Patent Number: 4,834,506

[45] Date of Patent: May 30, 1989

[54] PERCEIVED CONTRAST OF LIQUID CRYSTAL DISPLAYS

[75] Inventors: Kent R. Demke, Colorado Springs, Colo.; Neil D. Lubart, Austin, Tex.

[73] Assignee: International Business Machines Corporation, Armonk, N.Y.

[21] Appl. No.: 69,675

[22] Filed: Jul. 2, 1987

[51] Int. Cl.[4] ................................................ G02F 1/13
[52] U.S. Cl. .................................. 350/333; 350/332; 350/334; 350/345; 350/331 R
[58] Field of Search ............... 350/334, 332, 333, 345, 350/331 R

[56] References Cited

U.S. PATENT DOCUMENTS

| | | | |
|---|---|---|---|
| 4,196,973 | 4/1980 | Hochstrate | 350/345 |
| 4,289,383 | 9/1981 | Schwarzschild | 350/345 |
| 4,500,173 | 2/1985 | Leibowitz et al. | 350/345 |
| 4,755,415 | 7/1988 | Iijima et al. | 350/332 |

Primary Examiner—Stanley D. Miller
Assistant Examiner—Huy Kim Mai
Attorney, Agent, or Firm—Andrea P. Bryant

[57] ABSTRACT

There is disclosed a technique for improving user perceived quality of an LCD device comprising optimizing the electrode width and inter-electrode spacing, and simultaneously causing inter-electrode spaces and information to appear dark while the background appears bright.

12 Claims, 3 Drawing Sheets

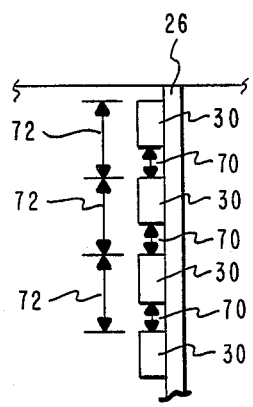
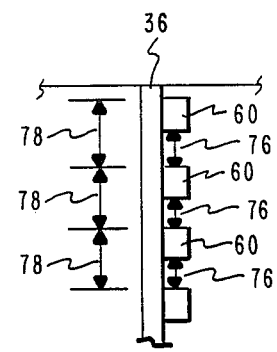
FIG. 4          FIG. 5
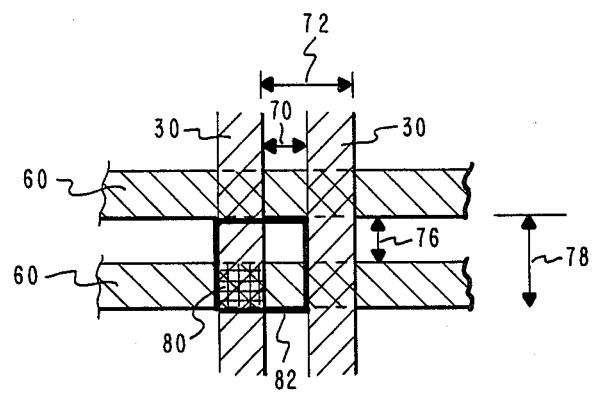
FIG. 6

PERCEIVED CONTRAST OF LIQUID CRYSTAL DISPLAYS

BACKGROUND OF THE INVENTION

1. Field of the Invention

This invention relates to display devices used as monitors in information processing systems. More particularly, it relates to improvements in electrode structure in liquid crystal display (LCD) devices for improving user perceived quality through improving user perceived contrast.

2. Description of the Prior Art

The prior art relating to LCD devices may be divided into three categories. The first category addresses the chemical aspect of the liquid crystal itself. The second category relates to the electrical aspects of driving the display device. The third category relates to the physical structure of the device itself.

One of the biggest problems associated with liquid crystal display devices relates to user perceived quality related to user perceived brightness and/or contrast. Conventional LCD devices compare unfavorably with the visual quality available from other display technologies such as CRTs and gas panels. It is desirable, therefore, to provide techniques for increasing user perceived quality of LCDs related to brightness and/or contrast. It has been found that increasing brightness without a change in contrast or increasing contrast without a change in brightness increases the overall user perceived visual quality level of an LCD device. Raising the level of user perceived visual quality may be achieved by improving the liquid crystal material, the electronics controlling the device or the structure of the device itself. The present invention falls into the last category and provides improvements in user perceived LCD quality by optimizing the geometry of LCD electrode structure.

SUMMARY OF THE INVENTION

The present invention proceeds from the discovery that the closer electrodes are located relative to other electrodes in the same orientation, the better user perceived quality of an LCD device. Therefore, in a conventional two layer, cross lattice electrode structure where the two layers of electrodes are located at 90 degree orientation to each other, the space between electrodes in the horizontal or vertical layer is made as small as possible and the device is controlled to have the inter-electrode space always appear dark in the powered down or up state. The powered up state is one in which the voltage is applied to the terminal of the device, while the powered down state is one in which no voltage is applied (that is, the device is electrically floating).

In the preferred embodiment described hereinafter the liquid crystal is constructed so that the powered down state provides a dark field. When in use as a display, the liquid crystal is powered up and may be either electrically on or off and/or logically on or off. In the preferred embodiment described hereinafter the liquid crystal is electrically controlled so that electrically off and logically on state provides a dark field for the area of the overlapping electrodes, hereinafter called the pel. The electrically on and logically off state provides a lighter, contrasting field for the pel. Thus, to display information the pels comprising a character or graphic are in the electrically off but logically on state while the surrounding pels are driven to the electrically on but logically off state, the result being dark characters or graphics on a light background.

In another embodiment the inter-electrode space is made dark through mechanical means by printing a matrix of black lines wherever electrode material is removed. The border color likewise may be achieved in the same manner. The width of inter-electrode space and pel geometry may be determined by masks used during manufacture of the electrode layers. Here the pel may be either dark or light in the powered down state.

BRIEF DESCRIPTION OF THE DRAWING

The above features and advantages of the present invention will be described with reference to the accompanying drawing in which the same reference numerals are used throughout to indicate the same elements and in which:

FIG. 4 is an enlarged detail of a portion of FIG. 2.

FIG. 5 is an enlarged detail of a portion of FIG. 3.

FIG. 6 is a schematic, detailed view of the electrodes 30 and 60 of FIGS. 2 and 3 seen from the same direction as FIG. 1.

DESCRIPTION OF THE PREFERRED EMBODIMENT

Figure 1:
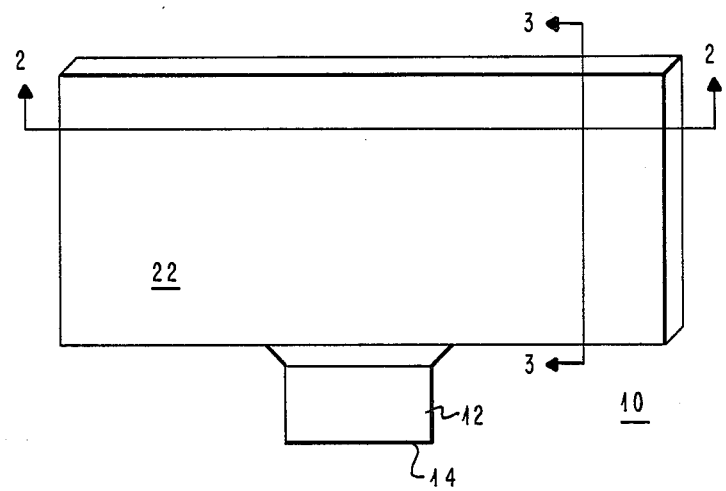
FIG. 1 shows a perspective view of an LCD screen.

Refer now to FIG. 1 which is a perspective view of an LCD device 10 serving as a monitor in a computer or other information processing system workstation. Device 10 has a surface 22 which a user views.

Figure 2:
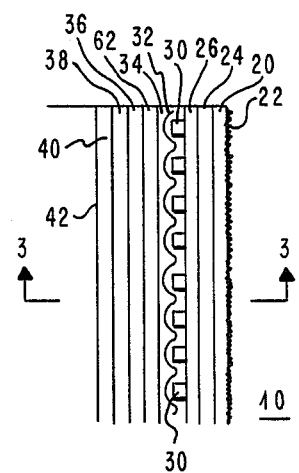
FIG. 2 is a cross-sectional view showing the internal structure of the LCD screen of FIG. 1 taken along line 2—2.

FIG. 2 is a schematic cross-section of device 10 taken along lines 2—2 rendering a view orthogonal to the column electrodes in the region between and parallel to the row electrodes in a direct addressed LCD device 10 which may, for example, be a twisted nematic LCD. LCD 10 comprises many layers of material laminated as shown in FIG. 2. A typical structure is as follows. An outer layer of glass 20 shown as 2—2 may either be roughened, anti-reflective coated, or a combination of the two for eliminating or controlling glare off the outer surface facing a user viewing device 10. As is conventional and well understood in the art, a polarizer comprises layer 24. The next layer 26 is glass to which transparent electrodes, which may be indium tin oxide, are attached. The transparent electrodes 30 are the column electrodes in this illustrative embodiment of the present invention. Electrodes 30 may be encapsulated in an insulator aligning layer 32. The liquid crystal electro-optic layer of LCD 10 is represented as 34. Not visible in this view is a representation of the row electrodes which may also be encapsulated in an insulator aligning layer 62. Another layer of glass 36 and polarizer 38 are provided. A reflector, transflector, or transparent layer 40 is also provided with may be glass or coated glass, or Mylar* or coated Mylar, as shown in this illustrative example.

*Trademark of E. I. duPont deNemours Company

When structure layer 40 is a transflector or transparent layer, it may be provided with a surface treatment to reduce unwanted reflections, thereby limiting light loss. When structure layer 40 is a transflector or transparent layer, the source of backlight such as an electroluminescent material is provided in the area indicated at 42. Layer 42 may be electroluminescent material. Those having skill in the art will appreciate that other backlight sources may be used.

Figure 3:
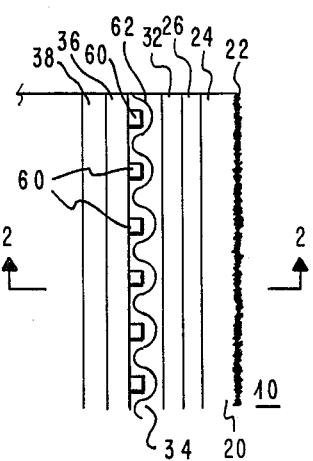
FIG. 3 is a cross-sectional view of the LCD screen of FIG. 1 taken along line 3—3.

FIG. 3 is a view similar to FIG. 2, but taken along lines 3—3 of the device 10 of FIG. 1 and illustrates the structural elements in cross-section orthogonal to row electrodes in the region between and parallel to the column electrodes of direct addressed LCD 10. Obviously the positions of row and column electrodes are shown for illustrative purposes only and those skilled in the art will understand that interchanging relative positions of the row and column electrodes with respect to each other in no way detracts from the invention.

Those structural elements in FIG. 3 which are the same as FIG. 2 will not be described again as they are the same. However, the row electrodes 60 are shown attached to glass layer 36. Electrodes 60 are like electrodes 30 preferably transparent electrodes which may be indium tin oxide contacts. Electrodes 60 may also be encapsulated in a insulator aligning layer 62 shown in FIG. 2. Not visible in this view is a representation of the column electrodes, which may also be encapsulated in an insulator aligning layer 32.

FIGS. 4 and 5 are analogous enlarged details of the electrodes 30 of FIG. 2 and 60 of FIG. 3. The inter-electrode spacing 70 is shown as the space between electrodes 30 and represents the horizontal gap or $G_H$. The distance 72 from the upper edge of a given electrode 30 to the upper edge of the next adjacent electrode 30 is the horizontal pitch or H. Similarly, in FIG. 5, the inter-electrode space 76 between adjacent electrodes 60 is the vertical gap or $G_V$. The distance 78 from one edge of an electrode 60 to the corresponding edge of the next adjacent electrode 60 is the vertical pitch or V.

FIG. 6 schematically illustrates adjacent electrodes 30 and 60. The present invention relates to governing the geometric relationship of these layers of electrodes making a cross-lattice adjacent the liquid crystal which is the heart of device 10. In the following discussion, one picture element (Pel) of device 10 is the minimum repeated electrically controllable structure and for purposes of this discussion, equals in size the intersection 80 of a row and column electrode in FIG. 6. The minimum repeated structure equals in size the PEL plus the horizontal gap 70 and the vertical gap 76 adjacent to that intersection. One minimum repeated structure is illustrated as enclosed in the heavy lines 82 in FIG. 6.

The following parameters shown in FIGS. 4 through 6 and other values necessary to a full understanding of the present invention are listed below.

$G_V$=Vertical Gap Between Conductors
$G_H$=Horizontal Gap Between Conductors
V=Vertical Pitch
H=Horizontal Pitch
$L_G$=Luminance of Gap (Inter-electrode space)
$B_P$=Luminance of Pel in Bright State
$D_P$=Luminance of Pel in Dark State
$C_P=B_p/D_p$=In-Pel Contrast
$C_E$=Effective Contrast Effective contrast is the user received contrast defined as the ratio of total luminance from a minimum repeated structure with a pel in its bright state to that same structure with the pel in its dark state. The in-pel contrast is defined as the ratio of the luminance of a pel in its bright state to that in its dark state. The luminance of the gap region does not change as a pel switches from bright to dark due to the physical structure of the electrodes as discussed above. Therefore, effective contrast which the user perceives may be written as follows:

$$C_E = \frac{KC_p + C_R C_p}{K + C_R C_p} \quad (1)$$

where $$K = \frac{(V - G_V)(H - G_H)}{(HG_V + VG_H - G_V G_H)} \quad (2)$$

and $$C_R = \frac{L_G}{B_p} \quad (3)$$

It can be seen that equation 2 is entirely a function of geometric factors.

The effects on contrast may be determined for various design choices of electrode structure with the help of equation (1). Three design choices leading to improvements in user perceived contrast were studied: luminance of the gap between electrodes; width of the gap between electrodes; and pel shape for a particular LCD device 10 to be identified. Sample parameters of interest have the following values.

$G_H = G_V = 0.04$ mm
V=0.44 mm, W=0.41 mm
$C_P$=6, $C_R$=1.1, when
$C_R$=1.1 the gap is bright, Then
$C_E$=3.0

The effect of using a dark gap instead of a bright one is illustrated below. If instead of $C_R$=1.1, the gap has the same luminance as a pel in its dark state, $D_P$, then $C_R = C_P^{-1}$ and $$C_E^{NEW} = \frac{1 + KC_P}{1 + K} = 5.1$$

The effective contrast increased 70% due to changing the gap from light to dark.

The effect of narrowing the gap can be seen from the following.

Take $G_H=G_V=0.02$ mm, all other parameters remaining as they were.

Then: $C_E^{NEW} = 4.0$

Effective contrast increased, 33% by narrowing the gap from 0.04 mm to 0.02 mm.

The effect of increasing Pel area may be appreciated from the following:

Take V=0.88 mm, all other parameters remaining as they were. Then:

$$C_E^{NEW} = 3.5$$

Effective contrast increases 15% from doubling the vertical dimension of the pel.

The above relationships have been worked out with particular, preferred parameters. Other values may be used for those parameters and satisfactory results obtained. Values for $G_V$ and $G_H$ range from about 0.005 to about 0.05 mm; for V and H, 0.05 to about 1.00 mm. A dark gap, inter-electrode spacing, may be implemented electronically by constructing an LCD device 10 which is dark in its off state by making the polarization axes of the two polarizes 24 and 38 (FIGS. 2 and 3) parallel. An inverter may then be used for all incoming bits for driving the device so that the electrically on but logically off pels are bright and the electrically off but logically on pels are dark.

Figure 7:
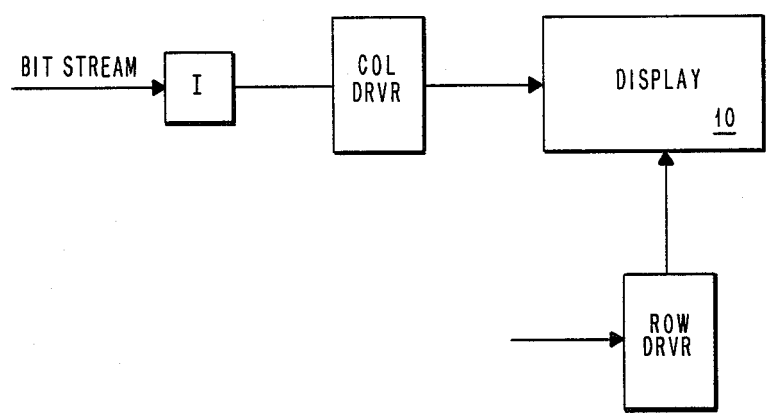
FIG. 7 is a simplified block diagram of some hardware components of a system embodying the present invention.

The present invention relates to optimizing the geometric relationships discussed above. However, FIG. 7 shows a simplified block diagram illustrating the concept of inverting the incoming data stream for driving the display device so that the electrically on, but logically off pels are bright and the electrically off, but logically on pels are dark.

Some large liquid crystal display are multiplexed, as is commonly known start of the art, in order to be able to address large numbers of pels without using a large amount of expensive electronics, an individual pel is addressed for only a brief period of time. As soon as the pel is no longer address and the voltage is no longer maintaining the electrically on state, the liquid crystal material 34 naturally attempts to relax thereby either darkening or lightening the display depending on whether the display is dark or bright in the power off state respectively. Such a phenomenon is called flicker, which may reach undesirable human factors levels. One way to control this relaxation is to periodically refresh the display, but even when this option is chosen, liquid crystals may still have perceptible flicker. The more pels involved in the relaxation process, the more the display is susceptible to flicker.

For a broad range of applications, such as text, most of the pels are in a logically off state when representing dark information on a bright background, as in the embodiment discussed above. In the embodiment discussed above, the logically off pels are the electrically on pels, so that most of the pels in the liquid crystal display are in the process of relaxation. This, in effect, has created a reverse video phenomenon. Reversed video displays require significantly higher refresh rates when a display uses progressive scanning. LCD devices have traditionally used progressive scanning because most LCDs are bright in the electrically off state and therefore, only a few active pels are necessary to represent information and present it as dark pels on a bright background.

While increasing the refresh frequency or maintaining the same refresh frequency but changing to a liquid crystal having a longer relaxation time are viable alternatives to solving flicker problem, we have found that interlaced scanning is preferable as a solution to the flicker problem for the following reasons. Increasing refresh frequency causes an increase in power consumption which rises as the frequency squared. Keeping the power consumption low for battery-powered devices is extremely critical. Liquid crystals with longer relaxation times may have the disadvantage of producing smearing when the displayed image is changed or in motion. However, interlaced scanning has the advantage of maintaining faster liquid crystal material and lower power consumption. This embodiment does not have the disadvantage inherent, for example, in interlaced scanned cathode ray tubes (CRT), such as line pairing, because the pel locations are physically fixed and not electronically determined or susceptible to electronic noise. This technique is not necessary for active matrix type liquid crystal display (such as the TFT) where the voltage is maintained at each pel by an active electronic element.

A dark gap may also be implemented mechanically by printing a matrix of black lines wherever electrode material is removed during the manufacturing process for LCD 10. Similarly the border color may be controlled in this manner.

In summary, the present invention provides a technique for improving user perceived contrast quality of LCD devices by controlling the geometry of electrode making up the lattice for energizing the liquid crystal. The width of the gap or inter-electrode spacing and the geometry of the pel, the smallest repeatable unit, may be determined in accordance with the present invention and implemented during manufacture of the electrode by appropriate choice of masks dimensions. The importance of gap width has been somewhat overlooked. The conventional view being that once the gap is too small to be seen explicitly, there is not necessity for further narrowing. We have shown this assumption to be incorrect. Our equation (1) enables the design of electrode structure or geometric structural dimensions to be chosen to provide a display device with the highest contrast and perceived visual quality for technology in use. The invention has been described with reference to a preferred embodiment in which the display is backlit. Obviously, the invention may be used in those situations without backlighting.

While the instant invention has been described having reference to a particular embodiment and modifications thereto, those having skill in the art will appreciate that various other changes in form and detail may be made without departing the spirit and scope of the invention as claimed.

What is claimed is:

1. A method for improving user perceived contrast quality of a liquid crystal display device comprising:
locating on a substrate parallel electrodes in two sets of electrodes, for superposition relative to each other at a predetermined angular displacement, for defining at each intersection of superimposed electrodes active display elements such that within each set of parallel electrodes, inter-electrode spaces are at their optimally minimal size; and causing said inter-electrode spaces to be always dark, choosing inter-electrode spacing in accordance with the relationship $$C_E = \frac{KC_p + C_R C_p}{K + C_R C_p} \quad (1)$$

where $$K = \frac{(V - G_V)(H - G_H)}{(HG_V + VG_H - G_V G_H)} \quad (2)$$

and $$C_R = \frac{L_G}{B_p} \quad (3)$$

$G_V$ = Vertical Gap Between Conductors
$G_H$ = Horizontal Gap Between Conductors
$V$ = Vertical Pitch
$H$ = Horizontal Pitch
$L_G$ = Luminance of Gap (Inter-electrode space)
$B_p$ = Luminance of Pel in Bright State
$D_p$ = Luminance of Pel in Dark State
$C_p = B_p/D_p$ = In-Pel Contrast $C_E$ = Effective Contrast 2. The methods of claim 1 wherein the causing step includes:
utilizing an LCD which is dark in its power off state; and
inverting data signals inoput thereto for driving the device.

3. The methods of claims 1 wherein the causing step includes:
making said inter-electrode spaces permanently dark as a step in the manufacture thereof.

4. The methods of claims 1 wherein the causing step includes:
providing a polarizer on either side of a liquid crystal, said polarizers having their axes of polarization aligned in parallel.

5. Improved display apparatus employing an electrode excited liquid crystal comprising a multilayer laminated structure including, sequentially,
a first polarizing means;
a first set of parallel electrodes;
liquid crystal material;
a second set of parallel electrodes at a predetermined angular offset from said first set of electrodes, intersections of said first and second sets of electrodes defining pels; and
a second polarizing means;
said geometric relationships within each set and between said two sets of electrodes being determined in accordance with $$C_E = \frac{KC_p + C_R C_p}{K + C_R C_p} \quad (1)$$

where $$K = \frac{(V - G_V)(H - G_H)}{(HG_V + VG_H - G_V G_H)} \quad (2)$$

and $$C_R = \frac{L_G}{B_p} \quad (3)$$

$G_V$ = Vertical Gap Between Conductors
$G_H$ = Horizontal Gap Between Conductors
V = Vertical Pitch
H = Horizontal Pitch
$L_G$ = Luminance of Gap (Inter-electrode space)
$B_p$ = Luminance of Pel in Bright State
$D_p$ = Luminance of Pel in Dark State
$C_p = B_p/D_p$ = In-Pel Contrast
$C_E$ = Effective Contrast 6. The apparatus of claim 5 wherein
said display apparatus is a matrix addressable display additionally including:
means for controlling user perceived flicker using interleaved scanning techniques for refreshing pels in said display.

7. The apparatus of claims 5 or 6 additionally including:
a source of back light.

8. The apparatus of claim 7 additionally including a transparent surface between said second polarizing means and said source of back light.

9. The apparatus of claim 7 additionally including a transflective surface between said second polarizing means and said source of back light.

10. The apparatus of claims 5 or 6 additionally including a reflective surface adjacent said second polarizing means.

11. Liquid crystal display apparatus including
a first polarizer;
a first plurality of parallel excitation electrodes;
liquid crystal material;
a second plurality of excitation electrodes, positioned orthogonally with respect to said first plurality of excitation electrodes; and
a second polarizer,
the improvement in user perceived contrast quality characterized by:
said two sets of excitation electrodes being geometrically arranged in accordance with $$C_E = \frac{KC_p + C_R C_p}{K + C_R C_p} \quad (1)$$

where $$K = \frac{(V - G_V)(H - G_H)}{(HG_V + VG_H - G_V G_H)} \quad (2)$$

and $$C_R = \frac{L_G}{B_p} \quad (3)$$

$G_V$ = Vertical Gap Between Conductors
$G_H$ = Horizontal Gap Between Conductors
V = Vertical Pitch
H = Horizontal Pitch
$L_G$ = Luminance of Gap (Inter-electrode space)
$B_p$ = Luminance of Pel in Bright State
$D_p$ = Luminance of Pel in Dark State
$C_p = B_p/D_p$ = In-Pel Contrast
$C_E$ = Effective Contrast 12. The apparatus of claim 11 wherein:
each of said first and second pluralities of excitation electrodes comprise transparent electrodes having a width dimension in the range of from about 0.05 mm to about 1.00 mm; and
$G_V$ and $G_H$ have a width of from about 0.005 mm to about 0.05 mm.

* * * * *